Oct. 3, 1967

E. KÖNIG ET AL 3,344,851

THERMOSTAT

Filed May 22, 1964

EBERHARD KÖNIG
HANS EGON RÖDEL
*INVENTOR.*

EBERHARD KÖNIG
HANS EGON RÖDEL
INVENTOR.

3,344,851
THERMOSTAT
Eberhard König, Überlingen (Bodensee), and Hans-Egon Rödel, Sipplingen (Bodensee), Germany, assignors to Bodenseewerk Perkin-Elmer & Co. G.m.b.H., Überlingen (Bodensee), Germany
Filed May 22, 1964, Ser. No. 369,456
Claims priority, application Germany, June 1, 1963, B 72,138; Dec. 16, 1963, B 74, 681
6 Claims. (Cl. 165—39)

This invention relates to a device for maintaining the temperature of an object very precisely at a desired value. In particular the invention concerns the utilization of a thermal buffer or temperature smoother, which controls the rate of heat flow between a thermostatically controlled heat source and the object the temperature of which is desired to be precisely regulated. Specifically, the thermal buffer is adjustable to at least two different positions so as to allow it to conduct heat from the heat source to the object at a first, more rapid rate, and then at a slower rate. By this means the temperature of the object may be rapidly brought up to a desired value and then maintained at an almost exactly constant temperature even though the thermostatically controlled heat source varies between an upper and a lower temperature. The device finds particularly valuable application in a gas chromatograph, in which it is desired to elevate the temperature of the detector or the separating column, or both, to an elevated operating temperature rather rapidly and then to hold this temperature quite steady (or to raise it in a smooth, even increasing temperature curve).

It has been previously proposed to control the temperature of an object, such as a detector or separating column of a gas chromatograph, by means of an electrically heated source which is controlled by means of a thermostat. The thermostat will switch off the electrical heating power at a certain upper temperature and will switch the power back on again at a particular lower temperature. Between the upper (switching-on) and the lower (switching-off) temperatures a certain temperature range must exist if the thermostatic control is to remain stable. Therefore the heat controlling system must have a certain lag or hysteresis. Although, at the cost of greater expense, this lag or hysteresis loop may be reduced by the use of more sensitive heat sensors, greater amplification gain, feedback and the like, the temperature control system thereby becomes more complicated and hence not only more costly but also more susceptible to interference and maintenance difficulties. The same difficulties apply to any attempt to utilize a steady, single temperature control instead of a two-temperature (upper and lower) thermostatic control.

In order to minimize the above problems, another solution has been proposed. This includes the utilization of a conventional two-point thermostatically controlled heat source, and the addition of means for reducing the effects of the heat source temperature variation on the object itself. This solution involves the utilization of a heat buffer or heat throttle between the heat source and the object, the temperature of which is desired to be accurately maintained. Such a heat buffer or throttle tends to smooth out or equalize the temperature variations due to the fluctuation in the heat source (caused by the two-point thermostat) from becoming directly effective on the object. The heat throttle acts in conjunction with the heat capacity of the object (or a container or block enclosing the same) like a thermodynamic analogue to an electric RC network. The object maintains a mean temperature which is practically isolated from the relatively rapid, minor temperature variations in the heat source. However, this technique of maintaining the object temperature constant is disadvantageous if the object temperature must frequently be varied from one temperature to another or is intended to be varied constantly in accordance with a particular temperature program. For example, in gas chromatographs, a series of discretely different temperatures or a continuously variable (increasing) temperature program is often utilized where the sample contains some components having greatly different volatility (i.e., widely spaced boiling points), so as to reduce the total time required for the higher boiling components to pass through the separating column to the detector. In addition, a different operating temperature is often utilized in successive runs even where each run is accomplished at a constant temperature (e.g., first an analysis of a sample having only highly volatile (low boiling) components at a relatively low temperature, followed by an analysis of a second sample composed solely of high boilers at a substantially higher constant temperature). Finally, an intermittently utilized gas chromatograph must obviously be brought up to the desired operating temperature from room temperature between uses. The presence of the heat buffer or throttle causes a long delay in the reaching of the new (more highly elevated) operating temperature from an appreciably lower temperature. Similarly, a heat buffer suitable for maintaining the object (e.g., separating column and/or detector) at a precise constant temperature may have too great a thermal resistance to allow relatively rapid temperature programming when desired.

The primary object of the invention is provision of a device which allows the object to be maintained at a constant (or closely controlled) temperature despite the small fluctuations in the heating source, but which also allows the object to be raised to an elevated initial operating temperature relatively rapidly.

A further object of the invention is provision of a device of the type just mentioned which is relatively simple and inexpensive.

The invention attains its objects by providing a heat buffer or throttle which normally smooths the temperature variation in the object caused by fluctuations in the heat source temperature, but which may be excluded or bypassed when it is desired to change the temperature of the object. One manner in which such a heating control may be effected is the utilization of an auxiliary heat source in direct heat exchanging relationship to the object (and therefore not effected by the heat buffer), which auxiliary source heats the object to the nominal starting temperature and is then switched off. The temperature of the object is then maintained by the thermostatically controlled heat source which heats the objects through a thermal buffer. The invention, however, utilizes the preferable technique of providing a heat buffer or throttle which has variable thermal resistance. This expedient avoids the necessity of providing a separate heat source for heating the object to the initial temperature, such auxiliary heat source also requiring an additional controlling means to determine the temperature at which it should be turned off. Instead a single thermostatically controlled heat source is utilized both for maintaining the constant temperature of the object and for reaching the desired initial temperature, so that only one source and temperature control is required. For initially heating the object to the initial temperature, the heat buffer or throttle has its thermal resistance reduced so that a substantially unimpeded heat flow may pass from the heat source to the object. When the nominal starting temperature has been reached, the heat resistance of the buffer is increased so that it then smoothes the temperature fluctuations of the heat source.

The more specific objects and advantages of the invention will become apparent upon reading the following specification, describing several embodiments of the invention, in conjunction with the accompanying drawings, in which:

FIGURE 1 diagrammatically illustrates the mode of operation of the invention by means of the electrical analogue thereof;

FIGURE 3 is a cross-sectional view of a specific embodiment, which may be utilized to maintain constant the temperature of the detector block in a gas chromatograph, and.

Figure 1:
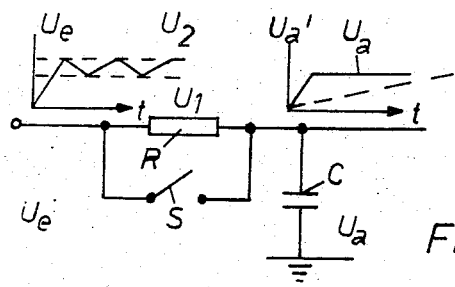

In FIGURE 1, which represents the electrical analogue of the invention, an RC network is shown, wherein a capacitor C is charged through a resistor R. The input voltage $U_e$ is assumed to increase very rapidly from a low value (such as zero) to a nominal or starting value between the limits $U_1$ and $U_2$ as indicated graphically in FIGURE 1. Once the input voltage has reached its operating range (i.e., between values $U_1$ and $U_2$), the relatively minor variations therein do not become effective on the other side of the capacitor because of the RC circuit (assuming that switch S is open). In other words the output voltage $U_a$ remains substantially constant, because of the smoothing effects of "throttling" by resistor R and the storing of capacitor C. The output voltage $U_a$ would, however, not follow the initial rapid rise of the input voltage, $U_e$, but would increase according to a time constant RC. The greater the smoothing effect of the RC network, the slower will be the intial rise in the output, since the greater will be the time constant RC. The rise in the output voltage would approximately follow the dotted line curve $U_a'$.

If, however, switch S is closed, bridging or short-circuiting the resistor R, then a rapid increase in the input voltage will also cause (without any appreciable lag) a rapid increase in the output voltage $U_a$ at capacitor C, as shown by the solid line curve. As soon as the output voltage $U_a$ has reached the nominal operating value, switch S may be opened. The resistor R therefore becomes operative so as to cause its smoothing effect, whereby the output voltage will remain substantially constant as shown by the horizontal solid line portion in FIGURE 1, even though the input voltage continues to fluctuate between values $U_1$ and $U_2$.

In the electrical analogue circuit of FIGURE 1, the input voltage $U_e$ may be thought of as corresponding to the temperature of the heat source, which varies over a certain range of values (between $U_1$ and $U_2$) because of the two-point thermostat temperature control. The resistance R corresponds to a thermal resistance (heat damper or throttle), and the switch S corresponds to means for supplying a direct passage for the heat flow from the source bypassing the heat damper (R) for allowing the temperature of the object (corresponding to $U_a$) to reach the initial desired operating temperature. Thus, switch S corresponds to a means for effecting a reduction or elimination of the effective thermal resistance of the heat damper or throttle (R).

Figure 2:
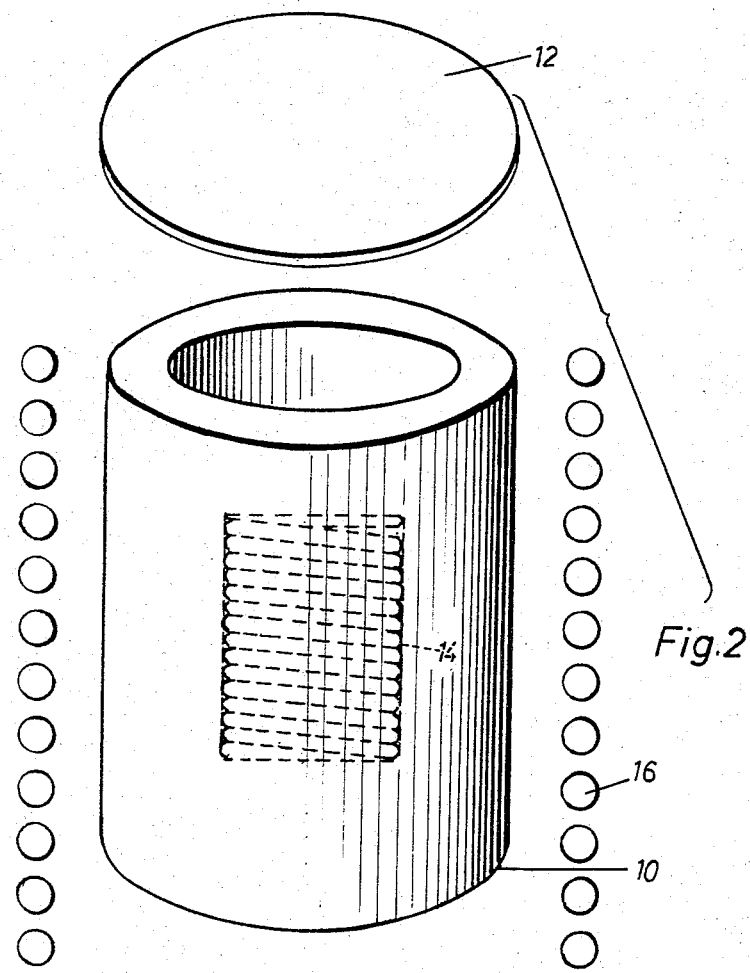
FIGURE 2 illustrates, somewhat schematically, an embodiment of the invention, wherein the adjustable heat buffer or throttle is provided by a Dewar vessel having a removable cover.

In one embodiment of the invention, shown in FIGURE 2, the heat damper or throttle is provided by a cylindrical Dewar vessel 10, the vacuum-spaced walls of which may be of glass with a black coating or finish on the exterior surface thereof. The Dewar vessel 10 may be optionally closed by means of a cover 12, having the shape of a thick hollow pancake with its interior evacuated; the exterior surface of cover 12 may also have a black finish. The same type of hollow evacuated glass cover (not shown) may be provided as the bottom of the vessel. Inside the vessel 10, may be arranged the object 14, the temperature of which it is desired to be maintained at a constant controlled value (object 14 being schematically illustrated as a coiled separating column for a gas chromatograph). Around the outside of vessel 10 there is shown a concentrically positioned helical heating coil 16.

For the purpose of rapidly raising the temperature of the object 14 to its initial operating temperature, cover 12 and the similar bottom of vessel 10 may be removed so that heat may be directly transmitted to the object inside the vessel. The resulting chimney effect will transmit the heat to the object relatively rapidly by convection. When the object 14 has been heated approximately to its nominal operating temperature, the vessel 10 is closed by means of cover 12 and the corresponding bottom element. Thereafter heat may be transmitted from the heating coil 16 to the object 14 only through the strong thermal damper or throttle constituted by the internal space between the walls of the Dewar vessel. For this reason the previously described smoothing effect will occur, so that the object temperature no longer closely follows the temperature of the control heating coil, but rather maintains a mean temperature value consonant with the average heat transfer from the coil to the interior of the Dewar vessel. Therefore, the temperature of the object 14 will not fluctuate with the minor, relatively rapid, temperature changes of the heating coil caused by the two-point thermostatic control. Removal of the top and bottom of the Dewar vessel therefore is analogous to the closing of the switch in the FIGURE 1 circuit, in that the removal of these elements causes the thermal resistance to be greatly reduced so as to allow rapid reaching of the initial operating temperature by the object 14.

Figure 3:
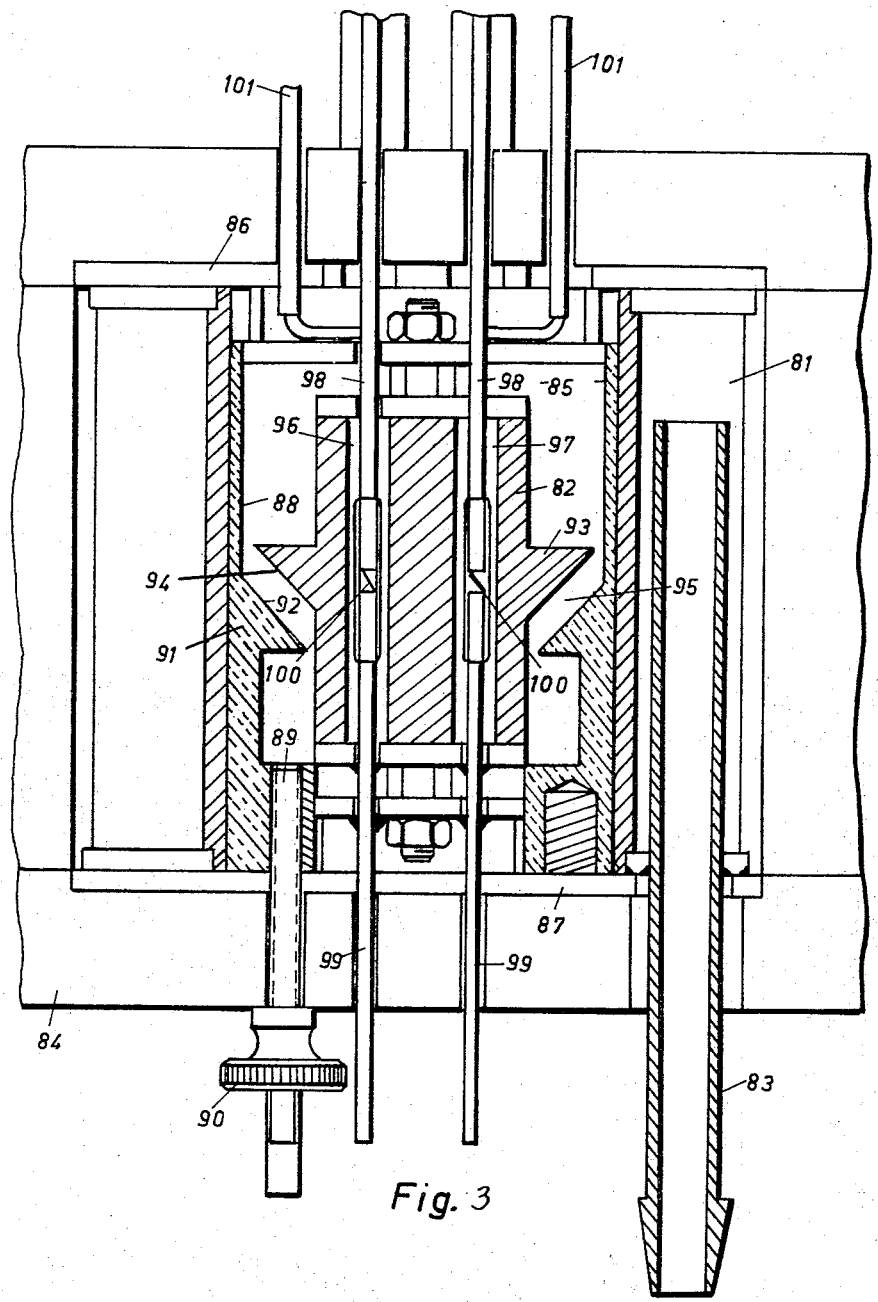

In FIGURE 3 there is illustrated a specific complete embodiment for maintaining the detector block of a gas chromatograph at a constant temperature. A fluid-tight annular passageway or container 81 is arranged around the detector block 82. Outer passageway 81 contains a heated fluid, which is admitted by means of inlet pipe 83, the temperature of the fluid being controlled by means of a thermostatically regulated heater (not shown). Container 81 and the heated fluid therein, which may be considered as the heat source for the detector block 82, are surrounded by insulating housing 84. The space 85 between the container 81 and the detector block 82 is closed at the top and the bottom by a pair of plates (86, 87, respectively) of relatively good heat-conducting material.

Closely adjacent the inner wall of the ring-shaped container 81, a heat bridge body 88 of good thermally conducting material is mounted for optional vertical movement. Heat bridge 88 is of generally hollow cylindrical shape and may be adjusted up and down by means of spindle 89 operated by knurled hand knob 90. The heat bridge body 88 has on its inner surface a ring-shaped projection or flange 91, having a generally conical upper surface 92. The detector block 82 has a somewhat similar ring-shaped flange or projection 93 extending from its outer wall. Projection 93 has a generally conical shaped outer or lower surface 94, which has the same configuration as but is inverted relative to surface 92 of the heat bridge flange 91, so that surfaces 92 and 94 may be positioned in intimate contacting, mating relationship. Movement of the heat bridge body 88 in an upward direction in FIGURE 6 (by means of the knob 90 and spindle 89) will cause the air gap at 95 between the conical surfaces 92 and 94 to steadily lessen so as to improve the heat transfer between the heat bridge body 88 and the detector block 82. Eventually the two conical surfaces 92 and 94 will come into contact, so as to allow essentially unrestricted heat flow from the heat source composed of fluid container 81 through heat bridge 88, flanges 91 and 93 to the detector block 82.

The detector block may contain two substantially identical micro thermal conductivity detectors, one measuring the thermal conductivity of an unknown gas, the other the comparison or standard gas stream, composed solely of the gas chromatographic carrier gas. Two axial bores 96 and 97 are provided in the detector block 82 for the purpose of containing the two identical detectors and their connecting capillary metallic tubes 98 and 99. The adjacent, but spaced, ends of each of these pairs of capillary tubes are connected by means of a sleeve-like casing of poorly electrically conducting material (e.g., polytetrafluoroethylene). Between the adjacent, but somewhat spaced, end faces of each pair of metallic tubes 98 and 99, thermistor beads 100 are suspended within the sleeve. The metallic capillary tubes 98 and 99 are not only used to supply the gas to the detectors and to support the thermistor beads forming them, but also may be utilized to carry the electrical current supplied to the thermistors. For this reason the metallic tubes (i.e., 99) on one side of the thermistor detectors may be grounded, and the other tubes 98 are connected to electrical leads 101.

For rapidly heating the detector block and the enclosed detectors to their operating temperature, the cylindrical heat bridge body 88 is axially moved in an upward direction until its flange 91 is brought into intimate contact with the mating flange 93 of the detector block. The relatively unimpeded heat flow from the hot fluid in container 81 through heat bridge body (a low thermal resistance path thereto being provided by the upper conducting plate 86, in addition to the path directly through the inner wall forming the container 81) and through the mating surfaces 92, 94 of flanges 91, 93 to the detector block 82 will cause the detector assembly to reach substantially the same temperature as the thermostatically controlled, heated fluid in a relatively short time. When the desired elevated temperature of the detector block has been reached, the heat bridge body 88 is again moved downwardly until it reaches the position shown in FIGURE 6. A heat damper or buffer is thereby formed by the air gap 95 between bridge 88 and detector block 82. The size of this air gap and therefore the particular heat resistance thereof may be adjusted precisely by means of the knurled knob 90.

Figure 4:
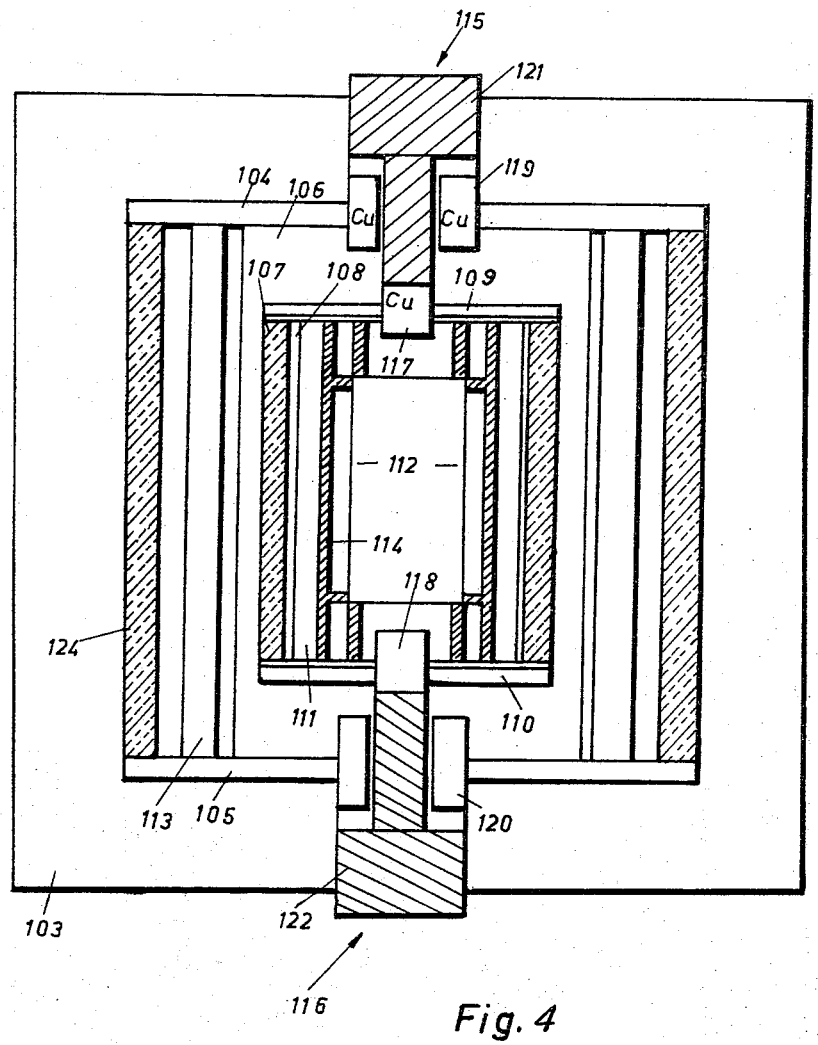
FIGURE 4 is a cross-sectional view of another specific embodiment for maintaining constant the temperature of both the separating column and the detector block of a gas chromatograph.

Another specific embodiment of the invention, as applied to a gas chromatographic apparatus, is shown in FIGURE 4. In this embodiment both the separating column and the detector may be maintained at a constant or desired temperature very accurately. A cylindrically shaped heater 124 is enclosed by an insulating housing 103. This heater is preferably an electrically heated filament coil, but may be instead a heated fluid container, similar to that shown (at 81) in FIGURE 3. The heater is temperature controlled, such as by having the electric current supplied thereto (when it is a coiled filament) switched on and off by a simple thermostat so as to keep the temperature within the volume surrounded by the heater at an almost constant temperature. The hollow cylinder formed by the heater is closed at the top and at the bottom by two plates 104 and 105, respectively, of good heat conducting material. In the space 106 thus defined, a gas chromatographic separating column 107 is positioned. This column may be composed of a capillary tube, wound as a relatively tight helical coil about a thin hollow supporting core 108, composed of good heat conducting material. Cylindrical core 108 is covered at the top and bottom by inner cover plates 109 and 110, respectively, of good conducting material. Interiorly of hollow core 108 a space 111 is formed in which the detector assembly 112 (e.g., such as one of the type shown in FIGURE 3) is arranged. By this construction, air gaps are formed between the heater 124 and the separating column 107, and also between the hollow core 108 and the detector block 112. Although these air gaps themselves act as heat dampers or resistors, their thermal resistance may be further increased by the utilization of additional dividing walls 113, and 114 of insulating material. These walls, 113, and 114, may also form a part of the supporting structure for the separating column and the detector block, respectively.

For the purpose of rapid heating up the separating column 107 and the detector block 112 at the beginning of each individual operation or desired change in the temperature of operation of the gas chromatograph, heat bridging bodies 115 and 116 are provided. These heat bridging bodies are mounted in central apertures in plates 104 and 109, and 105 and 110, respectively, in such manner as to allow vertical movement of the bodies. Each of these heat bridging bodies includes a heat conducting end section 117, 118, respectively, which produces a heat conduction path between the plate 109 or 110, respectively, and the detector block 112 when the two bridging bodies are in their innermost position (i.e., body 115 is lowered and body 116 is raised relative to the position shown in FIGURE 4). Annular heat conducting elements 119, 120 are also mounted on the poorly heat conducting support parts 121, 122, respectively, of the heat bridging bodies. Positioning of the two heat bridging bodies 115 and 116 in their innermost position (by means of any suitable mechanism) will therefore cause hollow conducting elements 119 and 120 to form heat conduction connections between the outer plates 104 and the inner plate 109, and between outer plate 105 and inner plate 110, respectively. When the two heat bridging bodies are so positioned, a relatively rapid heat transfer can take place from the heater 124 over plates 104, 105 to elements 119, 120, to inner plates 109, 110, and therefore through elements 117, 118 to the detector block 112. At the same time there will be heat flow from the inner plates 109 and 110 to the separating column 107, particularly in view of the good conducting properties of hollow core member 108.

After the detector block has been heated to the desired initial operating temperature, heat bridging bodies 115 and 116 are drawn back to the position shown in FIGURE 4 so that the heat buffers become operative. In this retracted position, the relatively rapid, small variations in the temperature of the heater 124 will be averaged out so that both the separating column 107 and the detector block 112 will be protected from such transient temperature changes. It should be noted that the temperature of the detector block is protected from such transient temperature changes in the heater not only by the same means which protects the separating column 107 but additionally by the column itself and the additional air gaps and insulating partitions positioned between the separating column and the detector block 112. The separating column 107 and the hollow cylindrical core 108 act as a secondary heat storage member (somewhat analogous to an electrical capacitor) so as to additionally smooth any temperature variations in the heater 124 as "seen" by the detector block 112. Thus, the detector block 112 may be considered as being in a thermal "circuit," analogous to being at the output of an electric circuit containing two series-connected RC filter networks.

The description of the operation of the various specific embodiments has generally assumed that it is desired to raise the temperature of the controlled object (separating column and/or detector) to an initial elevated operating temperature and then to maintain this temperature exactly constant thereafter. However as stated in the earlier part of this specification, it is sometimes desirable to raise the temperature of the object to an initial value and then to constantly raise it further at an even, controlled rate (i.e., temperature programming). Where the particular temperature program desired involves a relatively slow temperature rise, the heat buffer will cause only a small temperature lag in the object temperature relative to the programmed temperature of the heat source. However, where a relatively steep (rising) temperature versus time programming curve is desired, the high thermal resistance of the heat buffer may restrict the heat flow to the object to such an extent that the temperature of the latter lags the temperature programmed value by a substantial amount. This undesirable effect may be at least partially counteracted by selecting a temperature program for the heat source which has a greater rise rate than actually desired at the object, so that the lag error is cancelled to a great extent. However, at least certain embodiments of the invention (particularly the ones shown in FIGURE 3 and FIGURE 4) allow the effective thermal resistance of the heat buffer to be reduced from its maximum value in a more or less continuous manner. Thus, the heat bridging bodies of each of FIGS. 3 and 4 may be positioned near but not actually touching the elements which are in good thermal contact with the object. By these expedients, the effective thermal resistance of the heat bridging bodies of FIG. 3 and of FIG. 4 may be adjusted to values between the maximum and minimum (bypassed) ones, so as to cause a change analogous to utilizing a variable resistor in the electrical RC network of FIG. 1.

As may be seen by the varying structural features of the different disclosed embodiments, the invention may be embodied in a variety of structural forms. In its broadest aspects, however, the invention is not limited to any of the structural details of any of the embodiments, but rather is defined solely by the scope of the appended claims.

We claim:

1. A device for maintaining an object at a closely controlled desired temperature comprising:
    a hollow cylindrical heat source, the temperature of which is controlled so as to have an average value substantially at said desired object temperature, but which fluctuates about said average value;
    heat flow damping means having a high thermal resistance positioned substantially inside said cylindrical heat source and at least partially surrounding said object, for smoothing out the effect on said object of the short-term fluctuations of said heat source temperature;
    and a substantially cylindrically shaped heat bridging body of good heat-conducting material, having its outer wall in close physical and thermal contact with said heat source;
    said cylindrical heat bridging body being movable in the direciton of its cylinder axis and comprising an internal flange having a substantially conical surface extending generally perpendicular to said axis;
    said object comprising an outwardly extending part including a substantially conical surface, which in a first optional position of said heat bridging body substantially mates with said conical surface of said heat bridging body internal flange, so that a good heat-conduction path from said source to said object is effected;
    whereby said heat flow damping means is effectively bypassed when said heat bridging body is in said first position, thereby allowing a rapid change of the object temperature so as to approximate that of said source when a great temperature difference exists.

2. A device for maintaining an object at a closely controlled, desired temperature comprising:
    a heat source in the form of a hollow annular fluid-tight container having therein a fluid, the temperature of which is controlled so as to have an average value substantially at said desired object temperature, but which fluctuates about said average value;
    heat flow damping means having a high thermal resistance, positioned substantially inside said annular heat source and at least partially surrounding said object, for smoothing out the effect on said object of the short-term temperature fluctuations of said heat source;
    and a movable heat bridging body of good heat-conducting material which may be optionally positioned to contact both said annular heat source and said object, thereby effectively bypassing said high thermal resistance damping means by causing more direct heat transfer between said source and said object,
    whereby a rapid change of the object temperature, so as to approximate that of said source when a great temperature difference exists, may be optionally obtained.

3. A device for maintaining an object at a closely controlled, desired temperature, comprising:
    a hollow annular heat source, the temperature of which is controlled so as to have an average value substantially at said desired object temperature, but which fluctuates about said average value;
    heat flow damping means comprising an intermediary body positioned between but spaced from both said centrally located object and said surrounding annular heat source, so that said intermediary body at least partially surrounds said central object and is in turn at least partially surrounded by said annular heat source,
    heat insulating air spaces being thereby formed between each of said central object, said intermediary body, and said heat source, whereby said heat flow damping means normally smoothes out the effect on said object of the short-term temperature fluctuatoins of said heat source;
    a movable heat bridging body of good heat-conducting material, which may be optionally moved to a first position for providing a good heat-conducting path between said source and said object, thereby effectively bypassing said heat flow damping means;
    said movable heat bridging body comprising a first heat-conducting means which in said first position contacts both said source and said intermediary body to provide a good heat-conducting path therebetween;
    said movable heat bridging body also comprising a second heat-conducting means which in said first position contacts both said intermediary body and said central object to provide a good heat-conducting path therebetween;
    whereby said first and second heat-conducting means effectively provide a good heat-conducting path between said source and said object when said movable heat bridging body is in said first position, so that optional rapid heating of said object may be obtained when desired.

4. An object temperature controlling device according to claim 1, in which:
    said object comprises the detector of a gas chromatograph and a surrounding detector block thereof;
    said detector block comprising said outwardly extending part having said conical part.

5. An object temperature controlling device according to claim 3, in which:
    said intermediary body comprises a gas chromatographic separating column coiled about a hollow, substantially cylindrical core of good heat-conducting material;
    and said central object comprises the detector assembly of the same chromatograph;
    whereby said column is maintained at a controlled temperature and said detector is maintained at an even more closely maintained temperature when said heat bridging body is out of said first optional position.

6. An object temperature controlling device according to claim 5, in which:
    said heat source comprises a coil wound in the form of a hollow cylinder;
    a first pair of outer plates of good heat conducting material enclose the two ends of said hollow cylinder;
    a second pair of inner plates of good heat conducting material enclose the two ends of said cylindrically wound gas chromatographic separating column;
    each outer plate of said first pair being adjacent to, but spaced from, one inner plate of said second pair;

said heat bridging body comprising at least one assembly which is movably mounted in an opening in one of said outer plates;
said first heat-conducting means of said heat bridging assembly comprising a first heat conducting part which contacts both one of said outer plates and the adjacent one of said inner plates in said first optional position;
said second heat-conducting means of said heat bridging assembly comprising a second heat conducting part, thermally insulated from said first part, which contacts both said one inner plate and, by extending through a second opening therein, said centrally located detector assembly in said first optional position;
whereby in said first optional position said first conducting part of said heat bridging assembly provides a good heat conducting path between said one outer plate, which is in good thermal contact with said heat source, and said adjacent inner plate, thereby supplying optional rapid heating of said separating column; and said second conducting part provides a good heat conducting path between said one inner plate, which is now in good thermal contact with said heat source, and said detector assembly, thereby supplying optional rapid heating of said detector.

References Cited
UNITED STATES PATENTS

| | | | |
|---|---|---|---|
| 2,949,283 | 8/1960 | Smith | 165—40 |
| 3,006,611 | 10/1961 | Isham | 165—47 |
| 3,039,146 | 6/1962 | Engel | 165—146 |
| 3,155,883 | 11/1964 | Roth et al. | 165—39 |

ROBERT A. O'LEARY, *Primary Examiner.*

CHARLES SUKALO, *Examiner.*